United States Patent
Lee et al.

(10) Patent No.: US 11,608,437 B2
(45) Date of Patent: Mar. 21, 2023

(54) THERMOPLASTIC RESIN COMPOSITION AND MOLDED PRODUCT MANUFACTURED THEREFROM

(71) Applicant: LOTTE CHEMICAL CORPORATION, Seoul (KR)

(72) Inventors: Min Soo Lee, Uiwang-si (KR); Eric Arifin, Uiwang-si (KR); Bong Jae Lee, Uiwang-si (KR); Seon Hui Lee, Uiwang-si (KR); Sang Hyun Hong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 0 days.

(21) Appl. No.: 16/975,801

(22) PCT Filed: Feb. 27, 2019

(86) PCT No.: PCT/KR2019/002338
§ 371 (c)(1),
(2) Date: Aug. 26, 2020

(87) PCT Pub. No.: WO2019/168325
PCT Pub. Date: Sep. 6, 2019

(65) Prior Publication Data
US 2020/0407551 A1 Dec. 31, 2020

(30) Foreign Application Priority Data
Feb. 28, 2018 (KR) .................. 10-2018-0024737

(51) Int. Cl.
*C08L 67/02* (2006.01)
(52) U.S. Cl.
CPC .................... *C08L 67/02* (2013.01)
(58) Field of Classification Search
CPC ........................................... C08L 67/02
See application file for complete search history.

(56) References Cited

U.S. PATENT DOCUMENTS

| | | | |
|---|---|---|---|
| 9,527,991 B2 | 12/2016 | Lyons et al. | |
| 2005/0032961 A1 | 2/2005 | Oguni et al. | |
| 2014/0205785 A1 | 7/2014 | Goshima et al. | |
| 2015/0376400 A1* | 12/2015 | Kang | H01L 33/60 362/350 |
| 2018/0244919 A1 | 8/2018 | Kim et al. | |

FOREIGN PATENT DOCUMENTS

| | | |
|---|---|---|
| CN | 1590458 A | 3/2005 |
| CN | 103525041 A | 1/2014 |
| CN | 104845297 A | 8/2015 |
| JP | 2011-132478 A | 7/2011 |
| JP | 2012-201857 A | 10/2012 |
| JP | 2012-533645 A | 12/2012 |
| JP | 2017-197676 A | 11/2017 |
| KR | 10-2017-0024201 A | 3/2017 |
| WO | 2013/031541 A1 | 3/2013 |
| WO | 2013/108758 A1 | 7/2013 |
| WO | 2016/179770 A1 | 11/2016 |
| WO | 2019/168325 A1 | 9/2019 |

OTHER PUBLICATIONS

English machine translation of Shimizu et al. (JP 2017-197676) (Year: 2017).*
English machine translation of Honma (JP 2012201857) (Year: 2012).*
International Search Report in counterpart International Application No. PCT/KR2019/002338 dated May 30, 2019, pp. 1-6.
Search Report in counterpart European Application No. 19760874.8 dated Oct. 21, 2021, pp. 1-4.
Office Action in counterpart Chinese Application No. 201980024584.7 dated May 25, 2022, pp. 1-4.

* cited by examiner

*Primary Examiner* — Michael F Pepitone
(74) *Attorney, Agent, or Firm* — Additon, Pendelton & Witherspoon, P.A.

(57) ABSTRACT

A thermoplastic resin composition of the present invention comprises: about 100 parts by weight of a polyester resin; about 15 to about 100 parts by weight of glass fibers; and about 2 to about 20 parts by weight of a modified olefin copolymer, the modified olefin copolymer comprising an epoxy modified olefin copolymer and a maleic anhydride modified olefin copolymer, wherein the weight ratio of the epoxy modified olefin copolymer and the maleic anhydride modified olefin copolymer is about 1:0.3 to about 1:3. The thermoplastic resin composition has excellent impact resistance, chemical resistance, and the like.

10 Claims, No Drawings

THERMOPLASTIC RESIN COMPOSITION AND MOLDED PRODUCT MANUFACTURED THEREFROM

CROSS-REFERENCE TO RELATED APPLICATIONS

This application claims priority to and the benefit of International Application No. PCT/KR2019/002338, filed Feb. 27, 2019, which published as WO 2019/168325 on Sep. 6, 2019, and Korean Patent Application No. 10-2018-0024737, filed in the Korean Intellectual Property Office on Feb. 28, 2018, the entire disclosure of each of which is incorporated herein by reference.

TECHNICAL FIELD

The present invention relates to a thermoplastic resin composition and a molded product manufactured using the same. More particularly, the present invention relates to a thermoplastic resin composition having good properties in terms of impact resistance, chemical resistance, and the like, and a molded product manufactured using the same.

BACKGROUND ART

As engineering plastics, a polyester resin, a copolymer thereof, and a blend thereof exhibit useful properties and are applied to various fields including interior and exterior materials for electric/electronic products. However, the polyester resin has problems of a low crystallization rate, low mechanical strength, and low impact strength.

Thus, various attempts have been made to improve mechanical strength and impact strength of the polyester resin by adding additives such as inorganic fillers to the polyester resin. For example, polybutylene terephthalate (PBT) resins reinforced by inorganic fillers such as glass fibers and the like are frequently used as materials for housings of an automobile component or a mobile phone. However, such materials have a limitation in improvement of impact resistance and can suffer from deterioration in properties due to deterioration in chemical resistance upon contact with an acidic or basic solution.

Therefore, there is a need for development of a thermoplastic resin composition having good impact resistance, chemical resistance, and balance therebetween.

The background technique of the present invention is disclosed in Japanese Patent Publication No. 2012-533645 and the like.

DISCLOSURE

Technical Problem

It is one aspect of the present invention to provide a thermoplastic resin composition having good properties in terms of impact resistance, chemical resistance, and the like.

It is another aspect of the present invention to provide a molded product formed of the thermoplastic resin composition.

The above and other aspects of the present invention can be achieved by the present invention described below.

Technical Solution

1. One aspect of the present invention relates to a thermoplastic resin composition. The thermoplastic resin composition includes: about 100 parts by weight of a polyester resin; about 15 parts by weight to about 100 parts by weight of glass fibers; and about 2 parts by weight to about 20 parts by weight of a modified olefin copolymer, wherein the modified olefin copolymer includes an epoxy modified olefin copolymer and a maleic anhydride modified olefin copolymer, and the epoxy modified olefin copolymer and the maleic anhydride modified olefin copolymer may be present in a weight ratio of about 1:0.3 to about 1:3.

2. In Embodiment 1, the polyester resin may include at least one selected from the group consisting of a polyethylene terephthalate, a polybutylene terephthalate, a polyethylene naphthalate, a polytrimethylene terephthalate, and a polycyclohexylenedimethylene terephthalate.

3. In Embodiment 1 or 2, the polyester resin may be a polybutylene terephthalate.

4. In Embodiments 1 to 3, the polyester resin may include about 1 wt % to about 10 wt % of a polyethylene terephthalate and about 90 wt % to about 99 wt % of a polybutylene terephthalate.

5. In Embodiments 1 to 4, the epoxy modified olefin copolymer may include an epoxy modified alkylene-alkyl (meth)acrylate copolymer obtained through copolymerization of an epoxy compound with an olefin copolymer obtained through copolymerization of an alkylene monomer and an alkyl (meth)acrylate monomer.

6. In Embodiments 1 to 5, the epoxy compound may include at least one selected from the group consisting of a glycidyl (meth)acrylate, an allyl glycidyl ether, and a 2-methylallyl glycidyl ether.

7. In Embodiments 1 to 6, the epoxy modified olefin copolymer may include a glycidyl (meth)acrylate modified ethylene-butyl acrylate copolymer.

8. In Embodiments 1 to 7, the maleic anhydride modified olefin copolymer may include a maleic anhydride modified alkylene-α-olefin copolymer obtained through graft copolymerization of maleic anhydride to an alkylene-α-olefin copolymer.

9. In Embodiments 1 to 8, the maleic anhydride modified olefin copolymer may include a maleic anhydride modified ethylene-butene copolymer.

10. In Embodiments 1 to 9, the thermoplastic resin composition may have a dart drop height of about 70 cm to about 90 cm, at which cracks are generated on a 2 mm thick specimen when a 500 g dart is dropped thereon in a DuPont drop test.

11. In Embodiments 1 to 10, the thermoplastic resin composition may have a dart drop height of about 65 cm to about 85 cm, at which cracks are generated on a 3.2 mm thick specimen when a 500 g dart is dropped thereon in a DuPont drop test after the specimen is dipped in a 68 wt % phosphoric acid solution for 3 minutes.

12. Another aspect of the present invention relates to a molded product. The molded product may be formed of the thermoplastic resin composition according to any one of Embodiments 1 to 11.

Advantageous Effects

The present invention provides a thermoplastic resin composition having good impact resistance, chemical resistance, and the like, and a molded product manufactured using the same.

BEST MODE

Hereinafter, embodiments of the present invention will be described in detail.

A thermoplastic resin composition according to the present invention includes: (A) a polyester resin; (B) glass fibers; and (C) a modified olefin copolymer.

As used herein to represent a specific numerical range, "a to b" is defined as "≥a and ≤b".

(A) Polyester Resin

The polyester resin according to the present invention may be selected from any polyester resins used in a typical thermoplastic resin composition. For example, the polyester resin may be obtained by polycondensation of a dicarboxylic acid component and a diol component, in which the dicarboxylic acid component may include: aromatic dicarboxylic acids, such as a terephthalic acid (TPA), an isophthalic acid (IPA), an 1,2-naphthalene dicarboxylic acid, an 1,4-naphthalene dicarboxylic acid, an 1,5-naphthalene dicarboxylic acid, an 1,6-naphthalene dicarboxylic acid, an 1,7-naphthalene dicarboxylic acid, an 1,8-naphthalene dicarboxylic acid, a 2,3-naphthalene dicarboxylic acid, a 2,6-naphthalene dicarboxylic acid, a 2,7-naphthalene dicarboxylic acid, and the like; and aromatic dicarboxylates, such as a dimethyl terephthalate (DMT), a dimethyl isophthalate, a dimethyl-1,2-naphthalate, a dimethyl-1,5-naphthalate, a dimethyl-1,7-naphthalate, a dimethyl-1,7-naphthalate, a dimethyl-1,8-naphthalate, a dimethyl-2,3-naphthalate, a dimethyl-2,6-naphthalate, a dimethyl-2,7-naphthalate, and the like, and in which the diol component may include an ethylene glycol, an 1,2-propylene glycol, an 1,3-propylene glycol, a 2,2-dimethyl-1,3-propane diol, an 1,3-butane diol, an 1,4-butane diol, an 1,5-pentane diol, an 1,5-pentane diol, an 1,6-hexane diol, and a cycloalkylene diol.

In some embodiments, the polyester resin may include at least one selected from the group consisting of a polyethylene terephthalate (PET), a polybutylene terephthalate (PBT), a polyethylene naphthalate (PEN), a polytrimethylene terephthalate (PTT), and a polycyclohexylenedimethylene terephthalate (PCT).

In some embodiments, the polyester resin may be prepared by mixing about 10 wt % or less of polyethylene terephthalate with about 90 wt % or more of polybutylene terephthalate, for example, by mixing about 1 to about 10 wt % of polybutylene terephthalate or polyethylene terephthalate with about 90 to about 99 wt % of polybutylene terephthalate. Within this range, the thermoplastic resin composition can exhibit good impact resistance, chemical resistance, and the like.

In some embodiments, the polyester resin may have an intrinsic viscosity [η] of about 0.5 dl/g to about 1.5 dl/g, for example, about 0.7 dl/g to about 1.3 dl/g, as measured using o-chloro phenol as a solvent at 25° C. Within this range, the thermoplastic resin composition can exhibit good mechanical properties.

(B) Glass Fibers

According to the present invention, the glass fibers serve to improve mechanical properties, such as rigidity and the like, of the thermoplastic resin composition, and may be selected from glass fibers used in a typical thermoplastic resin composition.

In some embodiments, the glass fibers may have a fibrous shape and may have various cross-sectional shapes, such as circular, elliptical, and rectangular shapes. For example, fibrous glass fibers having circular and/or rectangular cross-sectional shapes may be preferred in terms of mechanical properties.

In some embodiments, the glass fibers having a circular cross-sectional shape may have a cross-sectional diameter of about 5 μm to about 20 μm and a pre-processing length of about 2 mm to about 20 mm, and the glass fibers having a rectangular cross-sectional shape may have an aspect ratio (a ratio of major diameter to minor diameter in a cross-section of the glass fiber) of about 1.5 to about 10, a minor diameter of about 2 μm to about 10 μm, and a pre-processing length of about 2 mm to about 20 mm. Within this range, the thermoplastic resin composition can have good properties in terms of rigidity and processability.

In some embodiments, the glass fibers may be subjected to surface treatment with a typical surface treatment agent.

In some embodiments, the glass fibers may be present in an amount of about 15 parts by weight to about 100 parts by weight, for example, about 20 parts by weight to about 90 parts by weight, specifically about 20 parts by weight to about 70 parts by weight, relative to about 100 parts by weight of the polyester resin. If the content of the glass fibers is less than about 15 parts by weight relative to about 100 parts by weight of the polyester resin, the thermoplastic resin composition can suffer from deterioration in stiffness, impact resistance, and the like, and if the content of the glass fibers exceeds about 100 parts by weight, the thermoplastic resin composition can suffer from deterioration in chemical resistance and processability, such as extrusion processability and injection moldability.

(C) Modified Olefin Copolymer

The modified olefin copolymer according to the present invention serves to improve impact resistance and chemical resistance of the thermoplastic resin composition, and may include (C1) an epoxy modified olefin copolymer and (C2) a maleic anhydride modified olefin copolymer.

(C1) Epoxy Modified Olefin Copolymer

An epoxy modified olefin copolymer according to one embodiment is a reactive olefin-based copolymer obtained through copolymerization of an epoxy compound, which is a reactive functional group, to an olefin-based copolymer, and serves to improve impact resistance and chemical resistance of the thermoplastic resin composition together with the maleic anhydride modified olefin copolymer.

In some embodiments, the epoxy compound may include a glycidyl (meth)acrylate, an allyl glycidyl ether, a 2-methylallyl glycidyl ether, and mixtures thereof.

In some embodiments, the epoxy modified olefin copolymer may be obtained through copolymerization of the epoxy compound to the olefin-based copolymer obtained through copolymerization of an alkylene monomer and an alkyl (meth)acrylate monomer. The alkylene monomer may be a $C_2$ to $C_{10}$ alkylene and may be selected from the group consisting of, for example, an ethylene, a propylene, an iso-propylene, a butylene, an isobutylene, an octene, and combinations thereof. The alkyl (meth)acrylate monomer may be a $C_1$ to $C_8$ alkyl (meth)acrylate and may be selected from the group consisting of, for example, a methyl acrylate, an ethyl acrylate, a n-propyl acrylate, a n-butyl acrylate, a 2-ethylhexyl acrylate, a methyl methacrylate, an ethyl methacrylate, a n-propyl methacrylate, a n-butyl methacrylate, a 2-ethylhexyl methacrylate, and combinations thereof.

In some embodiments, the epoxy modified olefin copolymer may include a glycidyl (meth)acrylate modified ethylene-butyl acrylate copolymer.

In some embodiments, the epoxy modified olefin copolymer may have a melt-flow index of about 2 g/10 min to about 50 g/10 min, for example, about 5 g/10 min to about 25 g/10 min, as measured under conditions of 190° C. and 2.16 kg in accordance with ASTM D1238.

In some embodiments, the epoxy modified olefin copolymer may be obtained through copolymerization of about 0.1 parts by weight to about 20 parts by weight of the epoxy compound, for example, about 1 part by weight to about 10 parts by weight of the epoxy compound, to about 100 parts by weight of the olefin-based copolymer. Within this range, the thermoplastic resin composition can have good properties in terms of impact resistance, chemical resistance, compatibility thereof, and the like.

(C2) Maleic Anhydride Modified Olefin Copolymer

A maleic anhydride modified olefin copolymer according to one embodiment is a reactive olefin-based copolymer obtained through copolymerization of maleic anhydride, which is a reactive functional group, to an olefin-based copolymer, and serves to improve impact resistance and chemical resistance of the thermoplastic resin composition together with the epoxy modified olefin copolymer.

In some embodiments, the maleic anhydride modified olefin copolymer may be obtained through graft copolymerization of the maleic anhydride to an olefin-based copolymer obtained through copolymerization of two or more types of alkylene monomers. The alkylene monomer may be a $C_2$ to $C_{10}$ alkylene and may be selected from the group consisting of, for example, an ethylene, a propylene, an iso-propylene, a butylene, an isobutylene, an octene, and combinations thereof.

In some embodiments, the maleic anhydride modified olefin copolymer may include a maleic anhydride modified ethylene-α-olefin copolymer obtained through copolymerization of maleic anhydride to an alkylene-α-olefin copolymer.

In some embodiments, the maleic anhydride modified olefin copolymer may include a maleic anhydride modified ethylene-butene copolymer.

In some embodiments, the maleic anhydride modified olefin copolymer may have a melt-flow index of about 0.5 g/10 min to about 20 g/10 min, for example, about 1 g/10 min to about 10 g/10 min, as measured under conditions of 190° C. and 2.16 kg in accordance with ASTM D1238.

In some embodiments, the maleic anhydride modified olefin copolymer may be obtained through graft copolymerization of about 0.1 parts by weight to about 5 parts by weight of the maleic anhydride, for example, about 0.5 parts by weight to about 2 parts by weight of the maleic anhydride, to about 100 parts by weight of the olefin-based copolymer. Within this range, the thermoplastic resin composition can have good properties in terms of impact resistance, chemical resistance, compatibility thereof, and the like.

In some embodiments, the epoxy modified olefin copolymer (C1) and the maleic anhydride modified olefin copolymer (C2) may be present in a weight ratio (C1:C2) of about 1:0.3 to about 1:3, for example, about 1:0.5 to about 1:2. If the weight ratio is less than about 1:0.3 or exceeds about 1:3, the thermoplastic resin composition can suffer from deterioration in impact resistance, chemical resistance, and the like.

In some embodiments, the modified olefin copolymer may be present in an amount of about 2 parts by weight to about 20 parts by weight, for example, about 5 parts by weight to about 15 parts by weight, relative to about 100 parts by weight of the polyester resin. If the content of the modified olefin copolymer is less than about 2 parts by weight relative to about 100 parts by weight of the polyester resin, the thermoplastic resin composition can suffer from deterioration in impact resistance, chemical resistance, and the like, and if the content of the modified olefin copolymer exceeds about 20 parts by weight, the thermoplastic resin composition can suffer from deterioration in injection moldability, external appearance, and the like.

In some embodiments, the glass fibers (B) and the modified olefin copolymer (C) may be present in a weight ratio (B:C) of about 4:1 to about 10:1. Within this range, the thermoplastic resin composition can have good impact resistance, good chemical resistance, and the like.

The thermoplastic resin composition according to one embodiment of the present invention may further include additives used in typical thermoplastic resin compositions. Examples of the additives may include flame retardants, fillers, antioxidants, anti-dripping agents, lubricants, release agents, nucleating agents, heat stabilizers, stabilizers, pigments, dyes, and combinations thereof. In the thermoplastic resin composition, the additives may be present in an amount of about 0.001 parts by weight to about 40 parts by weight, for example, about 0.1 parts by weight to about 10 parts by weight, relative to about 100 parts by weight of the polyester resin.

The thermoplastic resin composition according to one embodiment of the present invention may be prepared in pellet form by mixing the aforementioned components, followed by melt extrusion in a typical twin-screw extruder at about 200° C. to about 280° C., for example, about 220° C. to about 250° C.

In some embodiments, the thermoplastic resin composition may have a dart drop height of about 70 cm to about 90 cm, for example, about 75 cm to about 90 cm, at which cracks are generated on a 2 mm thick specimen when a 500 g dart is dropped thereon in a DuPont drop test.

In some embodiments, the thermoplastic resin composition may have a dart drop height of about 65 cm to about 85 cm, for example, about 70 cm to about 85 cm, at which cracks are generated on a 3.2 mm thick specimen when a 500 g dart is dropped thereon in a DuPont drop test after the specimen is dipped in a 68 wt % phosphoric acid solution for 3 minutes.

A molded article according to the present invention is formed of the thermoplastic resin composition set forth above. The thermoplastic resin composition may be prepared in pellet form. The prepared pellets may be produced into various molded articles (products) by various molding methods, such as injection molding, extrusion, vacuum forming, casting, and the like. These molding methods are well known to those skilled in the art. The molded articles have good impact resistance, chemical resistance, and balance therebetween, and are useful as housings of electric/electronic products.

MODE FOR INVENTION

Next, the present invention will be described in more detail with reference to some examples. It should be understood that these examples are provided for illustration only and are not to be in any way construed as limiting the invention.

Example

Details of components used in Examples and Comparative Examples are as follows.

(A) Polyester resin (A1) Polybutylene terephthalate (PBT, Manufacturer: China National BlueStar (Group) Co., Ltd.) having an intrinsic viscosity [η] of 1.3 dl/g as measured using o-chloro phenol as a solvent at 25° C. was used.

(A2) Polyethylene terephthalate (PET, Manufacturer: SK Chemicals) having an intrinsic viscosity [η] of 0.8 dl/g as measured using o-chloro phenol as a solvent at 25° C. was used.

(B) Glass fibers

Glass fibers (Manufacturer: Nitto Boseki Co., Ltd.) having a rectangular cross-sectional shape, a minor diameter of 7 an aspect ratio of 4, and a pre-processing length of 3 mm was used.

(C) Modified olefin copolymer (C1) Epoxy modified olefin copolymer

Glycidyl methacrylate modified ethylene-butyl acrylate copolymer (Manufacturer: DuPont) was used.

(C2) Maleic anhydride modified olefin copolymer

Maleic anhydride modified ethylene-butene copolymer (Manufacturer: Mitsui Chemicals, Inc.) was used.

(C3) Modified olefin copolymer

Ethylene-methyl acrylate copolymer (Manufacturer: DuPont) was used.

Examples 1 to 4 and Comparative Examples 1 to 7

The aforementioned components were mixed in amounts as listed in Table 1, followed by extrusion at 260° C., thereby preparing a thermoplastic resin composition in pellet form. Here, extrusion was performed using a twin-screw extruder (L/D: 44, Φ: 45 mm) and the prepared pellets were dried at 80° C. for 4 hours or more and then subjected to injection molding using a 6 oz injection molding machine (molding temperature: 270° C., mold temperature: 120° C.), thereby preparing a specimen. The prepared specimen was evaluated as to the following properties and results are shown in Table 1.

Property Evaluation (1) Impact resistance: A dart drop height (unit: cm) of a 2 mm thick specimen was measured using a 500 g dart in accordance with a DuPont drop test method.

(2) Chemical resistance: A dart drop height (unit: cm) of a 3.2 mm thick specimen was measured using a 500 g dart in accordance with a DuPont drop test method after the specimen was dipped in a 68 wt % phosphoric acid solution for 3 minutes.

TABLE 1

|  |  | Example | | | | Comparative Example | | | | | | |
| --- | --- | --- | --- | --- | --- | --- | --- | --- | --- | --- | --- | --- |
|  |  | 1 | 2 | 3 | 4 | 1 | 2 | 3 | 4 | 5 | 6 | 7 |
| (A) (wt %) | (A1) | 91 | 91 | 91 | 100 | 91 | 91 | 91 | 91 | 91 | 91 | 91 |
|  | (A2) | 9 | 9 | 9 | — | 9 | 9 | 9 | 9 | 9 | 9 | 9 |
| (B) (parts by weight) |  | 67 | 67 | 67 | 67 | 67 | 67 | 67 | 67 | 67 | 10 | 110 |
| (C1) (parts by weight) |  | 3.5 | 5 | 6.5 | 5 | 10 | — | — | 2 | 8 | 5 | 5 |
| (C2) (parts by weight) |  | 6.5 | 5 | 3.5 | 5 | — | 10 | — | 8 | 2 | 5 | 5 |
| (C3) (parts by weight) |  | — | — | — | — | — | — | 10 | — | — | — | — |
| Impact resistance (cm) |  | 76 | 85 | 80 | 83 | 71 | 60 | 79 | 55 | 65 | 35 | 75 |
| Chemical resistance (cm) |  | 71 | 80 | 76 | 79 | 63 | 52 | 62 | 45 | 46 | 22 | 62 |

From the result, it could be seen that the thermoplastic resin compositions according to the present invention had good impact resistance, chemical resistance, and the like.

Conversely, it could be seen that the thermoplastic resin compositions prepared using one type of modified olefin copolymer or having a weight ratio not in the range of the present invention (Comparative Examples 1, 2, 4 and 5) suffered from deterioration in impact resistance and/or chemical resistance and the thermoplastic resin composition prepared using a different type of modified olefin copolymer (C3) than the modified olefin copolymers according to the present invention suffered from deterioration in chemical resistance. Further, it could be seen that the thermoplastic resin composition of Comparative Example 6 prepared using a small amount of glass fibers suffered from deterioration in impact resistance and chemical resistance and the thermoplastic resin composition of Comparative Example 7 prepared using an excess of glass fibers suffered from deterioration in chemical resistance and had poor processability.

It should be understood that various modifications, changes, alterations, and equivalent embodiments can be made by those skilled in the art without departing from the spirit and scope of the present invention.

The invention claimed is:

1. A thermoplastic resin composition comprising:
   about 100 parts by weight of a polyester resin comprising polyethylene terephthalate and polybutylene terephthalate, each having an intrinsic viscosity [η] of about 0.5 dl/g to about 1.5 dl/g, as measured using o-chloro phenol as a solvent at 25° C.;
   about 15 parts by weight to about 100 parts by weight of glass fibers; and
   about 2 parts by weight to about 20 parts by weight of a modified olefin copolymer,
   wherein the modified olefin copolymer comprises an epoxy modified olefin copolymer and a maleic anhydride modified olefin copolymer,
   wherein the epoxy modified olefin copolymer and the maleic anhydride modified olefin copolymer are present in a weight ratio of 1:0.3 to 1:2,
   wherein the thermoplastic resin composition has a dart drop height of about 70 cm to about 90 cm, at which cracks are generated on a 2 mm thick specimen when a 500 g dart is dropped thereon in a DuPont drop test, and
   wherein the thermoplastic resin composition has a dart drop height of about 65 cm to about 85 cm, at which cracks are generated on a 3.2 mm thick specimen when a 500 g dart is dropped thereon in a DuPont drop test after the specimen is dipped in a 68 wt % phosphoric acid solution for 3 minutes.

2. The thermoplastic resin composition according to claim 1, wherein the polyester resin comprises about 1 wt % to about 10 wt % of polyethylene terephthalate and about 90 wt % to about 99 wt % of polybutylene terephthalate.

3. The thermoplastic resin composition according to claim 1, wherein the epoxy modified olefin copolymer comprises an epoxy modified alkylene-alkyl (meth)acrylate copolymer obtained through copolymerization of an epoxy compound to an olefin copolymer obtained through copolymerization of an alkylene monomer and an alkyl (meth)acrylate monomer.

4. The thermoplastic resin composition according to claim 3, wherein the epoxy compound comprises a glycidyl (meth) acrylate, an allyl glycidyl ether, and/or a 2-methylallyl glycidyl ether.

5. The thermoplastic resin composition according to claim 1, wherein the epoxy modified olefin copolymer comprises a glycidyl (meth)acrylate modified ethylene-butyl acrylate copolymer.

6. The thermoplastic resin composition according to claim 1, wherein the maleic anhydride modified olefin copolymer comprises a maleic anhydride modified alkylene-α-olefin copolymer obtained through graft copolymerization of maleic anhydride to an alkylene-α-olefin copolymer.

7. The thermoplastic resin composition according to claim 1, wherein the maleic anhydride modified olefin copolymer comprises a maleic anhydride modified ethylene-butene copolymer.

8. A molded product formed of the thermoplastic resin composition according to claim 1.

9. The thermoplastic resin composition according to claim 1, wherein the thermoplastic resin composition has a dart drop height of about 75 cm to about 90 cm, at which cracks are generated on a 2 mm thick specimen when a 500 g dart is dropped thereon in a DuPont drop test and a dart drop height of about 70 cm to about 85 cm, at which cracks are generated on a 3.2 mm thick specimen when a 500 g dart is dropped thereon in a DuPont drop test after the specimen is dipped in a 68 wt % phosphoric acid solution for 3 minutes.

10. The thermoplastic resin composition according to claim 1, wherein each of the polyethylene terephthalate and polybutylene terephthalate has an intrinsic viscosity [η] of about 0.7 dl/g to about 1.3 dl/g, as measured using o-chloro phenol as a solvent at 25° C.

\* \* \* \* \*